(12) United States Patent
Webb

(10) Patent No.: US 8,607,740 B2
(45) Date of Patent: Dec. 17, 2013

(54) DOG CARRIER

(76) Inventor: Terry Kelvin Webb, Tarboro, NC (US)

( * ) Notice: Subject to any disclaimer, the term of this patent is extended or adjusted under 35 U.S.C. 154(b) by 48 days.

(21) Appl. No.: 13/420,843

(22) Filed: Mar. 15, 2012

(65) Prior Publication Data

US 2013/0239906 A1 Sep. 19, 2013

(51) Int. Cl.
*A01K 29/00* (2006.01)
(52) U.S. Cl.
USPC .......................................... 119/725
(58) Field of Classification Search
USPC .......... 119/725, 728, 850, 856; 224/158, 159; D30/145, 152; 294/140, 151, 152
See application file for complete search history.

(56) References Cited

U.S. PATENT DOCUMENTS

| 1,813,458 | A |   | 7/1931 | Meurer |  |
|---|---|---|---|---|---|
| 2,408,575 | A | * | 10/1946 | Norvig | 119/673 |
| 4,530,309 | A | * | 7/1985 | Collins | 119/863 |
| 4,644,902 | A | * | 2/1987 | Doyle | 119/497 |
| 5,501,441 | A | * | 3/1996 | Kegley | 269/289 R |
| 5,738,043 | A | * | 4/1998 | Manuel | 119/497 |
| 6,216,636 | B1 | * | 4/2001 | Butchko | 119/497 |
| 6,431,123 | B1 | * | 8/2002 | Hibbert | 119/850 |
| 6,631,697 | B1 | * | 10/2003 | Solze | 119/728 |
| 6,802,282 | B2 | * | 10/2004 | Muckleroy | 119/497 |
| 7,284,504 | B1 |   | 10/2007 | Purschwitz, Jr. et al. |  |
| 8,474,412 | B1 | * | 7/2013 | Walden et al. | 119/725 |
| 2005/0076853 | A1 | * | 4/2005 | Leo | 119/497 |
| 2005/0263102 | A1 | * | 12/2005 | Sherman et al. | 119/792 |
| 2008/0276880 | A1 | * | 11/2008 | Swisher et al. | 119/728 |
| 2009/0205586 | A1 | * | 8/2009 | Matthews | 119/843 |

FOREIGN PATENT DOCUMENTS

| DE | 29701118 U1 | 4/1998 |  |
|---|---|---|---|
| DE | 20300800 U1 | 4/2003 |  |
| JP | 10215724 A * | 8/1998 | A01K 29/00 |
| JP | 2007209321 A | 8/2007 |  |

* cited by examiner

*Primary Examiner* — David Parsley
*Assistant Examiner* — Danielle Clerkley
(74) *Attorney, Agent, or Firm* — James G. Passé; Passé Intellectual Property, LLC

(57) ABSTRACT

The present invention relates to a device for carrying a small four-legged animal. The device wraps around the body of the animal and provides handles for carrying the animal.

3 Claims, 3 Drawing Sheets

DOG CARRIER

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a dog carrier. In particular, it relates to a dog carrier that does not rely on inserting a dog's leg or legs into holes and the carrier can be easily placed around the dog.

2. Description of Related Art

Dogs and other small animals are frequently needed to be transported from one location to another. Where the distance is long, crate or cage type devices are adequate since they give some room for movement of the animal and the owner does not have to remain with the animal.

When a dog is to be transported a short distance, say from inside the house to the car, sometimes picking up the dog is difficult and placing the dog in a cage is impractical for short distances. Some designs from strap carrying, such as bags as is typical for fashion carrying, allow the dog to escape. Carriers which require the insertion of one or more legs into a carrier take too much time to position the dog and can cause irritation around the dog's leg. In a situation where such transportation is necessary, there is currently nothing that is quick, easy, inexpensive, and solves the problems of the previous dog carriers.

BRIEF SUMMARY OF THE INVENTION

The present invention relates to the discovery that if a device that wraps around the abdomen, partially surrounds the front legs (C fashion), is snug toward the back legs, and has a portion that extends forward in-between the front legs, a dog carrier can be fashioned that solves the problems of the previous devices.

Accordingly, in one embodiment there is a wrap around device for carrying a small four legged animal having two front legs and two back legs and an abdomen region comprising:
  a) a flat single piece of semi rigid flexible material having a top, a bottom, and two sides, designed to wrap around the abdomen midsection of the animal having opposing handles positioned in the sides which mate when wrapped around the animal for carrying;
  b) the semi-rigid material having C shaped portions positioned at a top of the material positioned for partially enclosing the two front legs of the animal;
  c) a support piece positioned in a center of the top of the device in-between the two C shaped portions for supporting the animal in-between the two front legs; and
  d) the device having a length such that the bottom extends toward the two back legs.

DETAILED DESCRIPTION OF THE INVENTION

Figure 1:
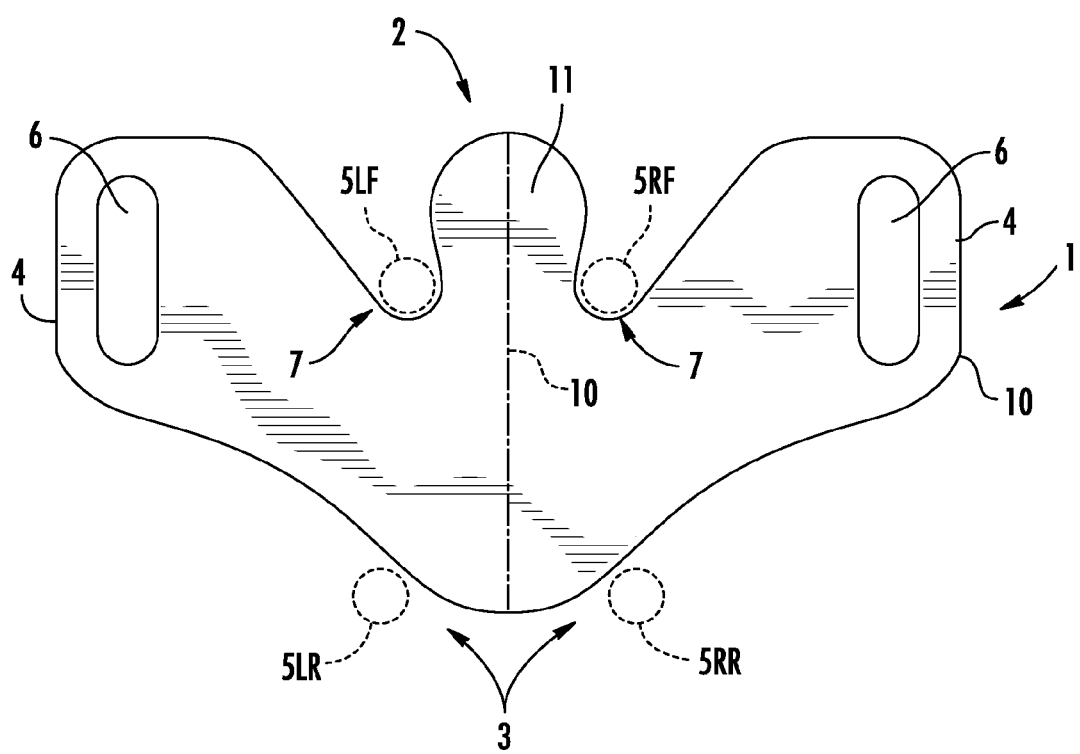
FIG. 1 is flat view of the carrier without an animal.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein "wrap around device" refers to a single piece of material that wraps around a small four legged animal's midsection region. Small four legged animals include dogs, cats, and the like. These types of animals generally have two front legs and two back legs.

As used herein "flat" refers to when not in use, the material is generally planar and can be laid flat on a flat surface. As used herein "semi rigid flexible material" refers to materials that will generally hold their shape but are still flexible. Cloth or nylon fabric would not be included. While they are flexible, they are not rigid in any way. Examples of materials useful in the manufacture of the device of the invention include, but are not limited to, ethylene vinyl acetate (EVA), silicone, ethylene propylene diene monomer (EPDM), rubber, neoprene, poly vinyl chloride (PVC), expanded polystyrene (EPS), polyurethane foam, expanded polyethylene (EPE), foam polyester, polyether urethane, polyolefin closed-cell foam and foam rubber, and similar polymers and rubbers. The device is thick enough to provide support but thin enough to be flexible enough to wrap around the animal. In general, the device is from about a quarter inch to about a half inch, one inch or more in width. While it can be of even thickness, it can also be of different thicknesses in different areas.

As used herein the term "top", "bottom" and "sides" refer to the front back and sides of the device respectively when the device is wrapped around the small animal and will be clear from the drawings and descriptions thereof. Handles attached to the semi-flexible material or cut-outs in the material that form handles are positioned in or at the sides of the semi-rigid material as shown in the drawings.

As used herein the term "C-shaped" refers to semi-circular cut-outs in the top of the device positioned in spaced relationship to accept the two front legs of the animal. Extended forward from a position in-between the two C-shaped cut-outs is a support piece which generally extends from in between the legs of the animal to as far forward as the bottom of the neck on the animal when in use. The width is such that a left and right side is up against the front legs of the animal and in part helps form the C-shaped cutouts. The wrap around device body portion extends far enough that it extends up to about the area of the back two legs of the animal.

Figure 3:
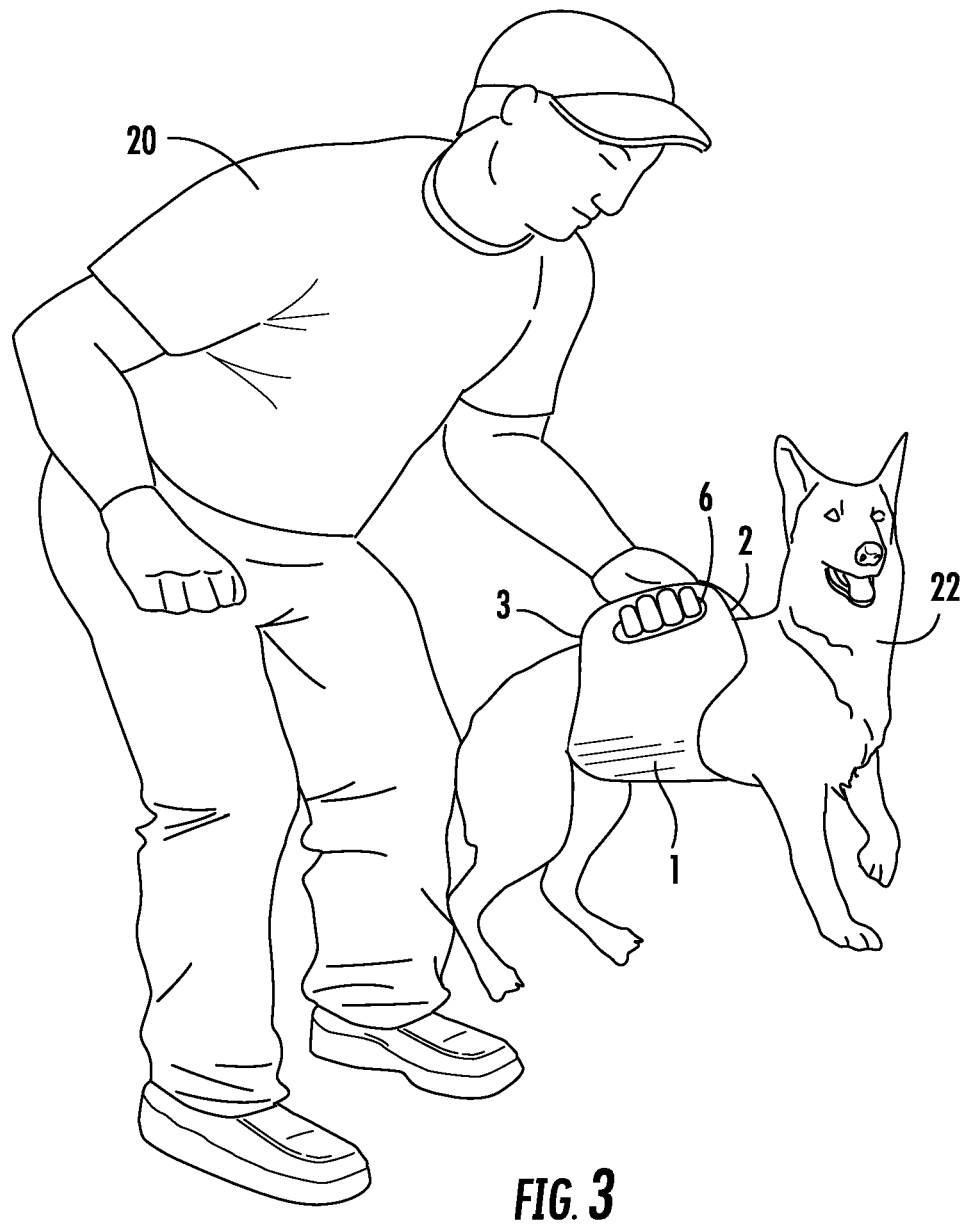
FIG. 3 is the device wrapped around a dog being carried by the device of the present invention.

Now referring to the drawings, FIG. 1 is a frontal view of an embodiment of the invention when it is in a planar state. Carrier 1 consists of top 2, bottom area 3, and two sides 4. Handles 6 are positioned on each of the sides. While cut-outs are shown attached handles could be used in an embodiment. C shaped portions 7 forms a semi-circle around dog front legs 5$lf$ and 5$rf$. Two rear legs 5$lr$ and 5$rr$ are shown positioned at or near the bottom 3 of the device 1. In between C shaped portions 7 is support piece 8. Support piece 8 is in the top and supports the bottom of a dog in-between the front legs 5$lf$ and 5$rf$. In this embodiment the device has thickness 10 about one quarter inch to about an inch. Centerline 11 is the area that is where the device contacts the abdomen of a small animal and is curved along so that handles 6 match to create a single handle as shown in FIG. 3.

Figure 2:
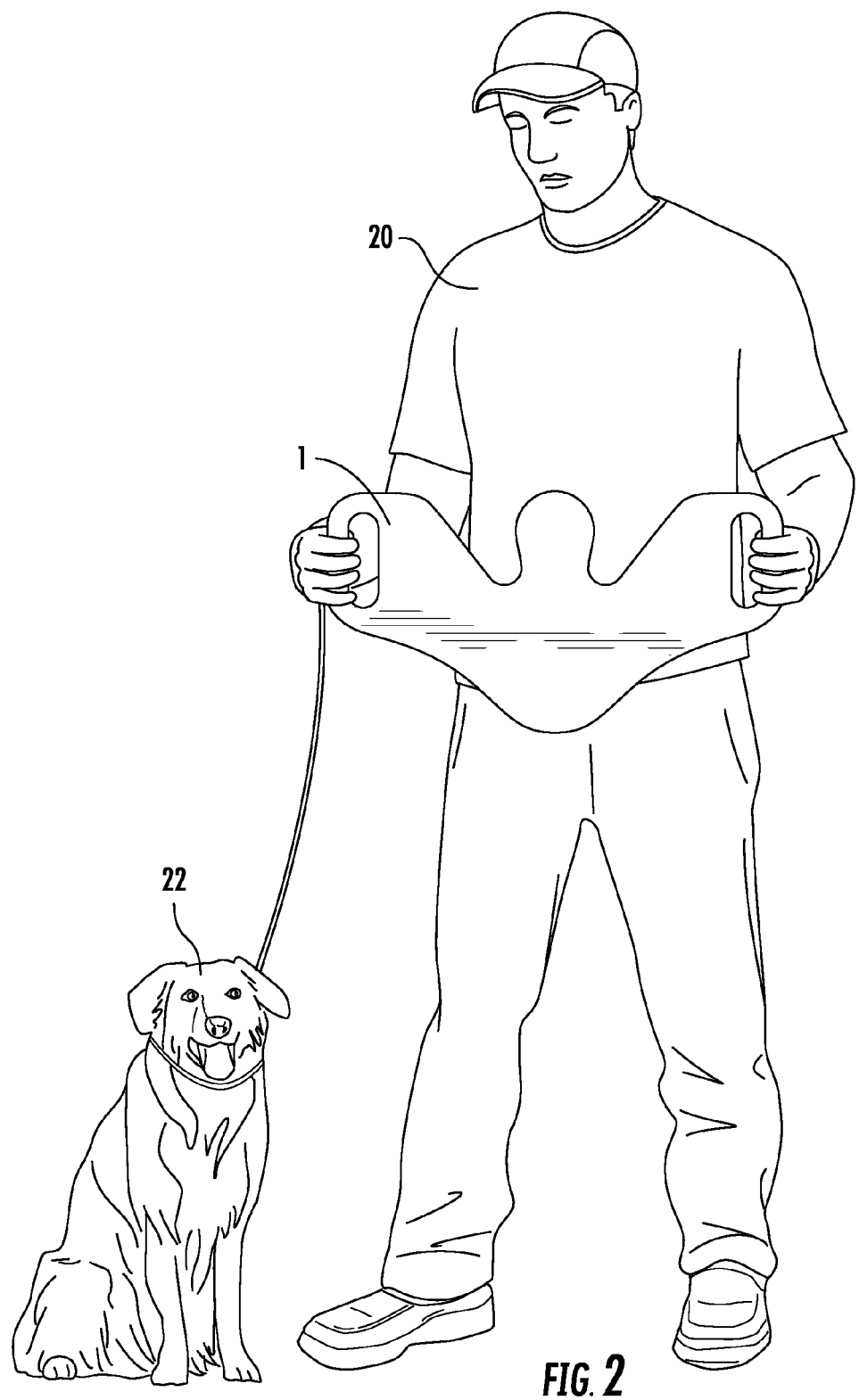
FIG. 2 is a human picking up the device for use for perspective.

FIG. 2 depicts a person 20 holding the device 1 for perspective. The person has a dog 22 on a leash. FIG. 3 shows the person 20 using device 1 to carry dog 22. One can see handles 6 brought together to form a single handle and can see the top 2 and bottom 3 positioned on dog 22.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A single piece wrap around device for carrying a small four legged animal having two front legs and two back legs and an abdomen region the single piece comprising:
   a) a flat semi rigid flexible material having a top, a bottom and two sides, designed to wrap around the abdomen midsection of the animal having opposing handles in the sides which mate when wrapped around the animal for carrying;
   b) shaped c shaped portions positioned at a top of the material positioned for partially enclosing the two front legs of the animal;
   c) a support piece positioned in a center of the top of the device in-between the two C shaped portions for supporting the animal in-between the two front legs; and
   d) the device having a length such that the bottom extends toward the two back legs wherein the C shaped portions and the support piece positioned in-between form at least a portion of the top perimeter.

2. The device according to claim 1 wherein the device is wrapped around a dog.

3. The device according to claim 1 wherein the device is made of a material selected from the group consisting essentially of EVA, silicone, EDPM, rubber, neoprene, PVC, EPS, polyurethane foam, EPE, Foam polyester, Polyether urethane, Polyolefin closed-cell foam and foam rubber.

* * * * *